United States Patent
Yang et al.

(10) Patent No.: US 10,093,184 B2
(45) Date of Patent: Oct. 9, 2018

(54) DIRECT CURRENT VOLTAGE CLAMPING IN A VEHICLE

(71) Applicant: Ford Global Technologies, LLC, Dearborn, MI (US)

(72) Inventors: Shuitao Yang, Dearborn Heights, MI (US); Yan Zhou, Canton, MI (US); Fan Xu, Novi, MI (US); Lihua Chen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 15/261,111

(22) Filed: Sep. 9, 2016

(65) Prior Publication Data
US 2018/0072158 A1    Mar. 15, 2018

(51) Int. Cl.
| | |
|---|---|
| *B60L 1/00* | (2006.01) |
| *B60L 3/00* | (2006.01) |
| *H02P 21/22* | (2016.01) |
| *B60K 6/46* | (2007.10) |
| *B60L 11/08* | (2006.01) |
| *B60L 11/18* | (2006.01) |
| *H02M 7/46* | (2006.01) |
| *H02M 7/537* | (2006.01) |
| *H02P 27/06* | (2006.01) |

(52) U.S. Cl.
CPC ............... *B60L 3/003* (2013.01); *B60K 6/46* (2013.01); *B60L 11/08* (2013.01); *B60L 11/1809* (2013.01); *H02M 7/46* (2013.01); *H02M 7/537* (2013.01); *H02P 21/22* (2016.02); *H02P 27/06* (2013.01); *B60L 2210/40* (2013.01); *B60L 2240/527* (2013.01); *B60Y 2200/92* (2013.01); *B60Y 2400/61* (2013.01); *Y10S 903/903* (2013.01)

(58) Field of Classification Search
CPC ........ H02P 21/22; H02P 27/06; H02M 7/537; B60Y 2400/61; B60Y 2200/92; B60L 2240/527; B60L 2210/40; B60L 11/1809; B60L 3/003; B60K 6/46; Y10S 903/903
See application file for complete search history.

(56) References Cited

U.S. PATENT DOCUMENTS

| | | | | |
|---|---|---|---|---|
| 8,670,219 | B2 * | 3/2014 | Disney | H03K 17/0822 361/56 |
| 2005/0254265 | A1 * | 11/2005 | Yamada | H02M 3/156 363/13 |
| 2014/0340095 | A1 * | 11/2014 | Schneider | B60W 20/00 324/511 |
| 2018/0041121 | A1 * | 2/2018 | Sneep | H02M 3/158 |

* cited by examiner

*Primary Examiner* — Jared Fureman
*Assistant Examiner* — Duc M Pham
(74) *Attorney, Agent, or Firm* — David B. Kelley; Brooks Kushman P.C.

(57) ABSTRACT

A vehicle system in a hybrid vehicle comprises a controller configured to generate for output a modulated voltage to a direct current capacitor to prevent voltage spikes on the capacitor in response to receiving a reference current via a direct current voltage clamping control block that outputs a reference current in response to a difference between a feedback voltage and a reference voltage exceeding a threshold.

20 Claims, 5 Drawing Sheets

DIRECT CURRENT VOLTAGE CLAMPING IN A VEHICLE

TECHNICAL FIELD

The present disclosure relates to a vehicle that utilizes both direct current (DC) and high voltage (HV) DC circuits.

BACKGROUND

Hybrid vehicles may utilize high voltage batteries that distribute DC voltage. A high voltage load may be output based on the hybrid battery or a motor of the hybrid vehicle. Such high voltage loads may increase voltage stress in certain scenarios.

SUMMARY

According to one embodiment, a vehicle system in a hybrid vehicle comprises a controller configured to generate for output a modulated voltage to a direct current capacitor to prevent voltage spikes on the capacitor in response to receiving a reference current via a direct current voltage clamping control block that outputs a reference current in response to a difference between a feedback voltage and a reference voltage exceeding a threshold.

According to a second embodiment, a vehicle system in a hybrid vehicle comprises a controller configured to generate for output a modulated voltage to a direct current capacitor to prevent voltage spikes of the capacitor in response to receiving a reference current via a direct current voltage clamping control block configured to output a reference current in response to a difference between a feedback voltage and a reference voltage exceeding a threshold.

A third embodiment discloses a method in a hybrid vehicle that includes receiving a reference voltage defining a threshold voltage value and a feedback voltage defining a direct current (DC) voltage of a DC capacitor of a vehicle motor inverter. The method further includes the step of generating for output a reference current via at least a voltage limiter in response to a difference between the feedback and reference voltages exceeding a threshold to prevent voltage spikes on the DC capacitor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments disclosed below propose a direct current (DC) voltage clamping control system and method to clamp extremely high voltage (HV) DC voltage that may be caused by high electromotive force (EMF) of a high-speed spinning motor.

Figure 1:
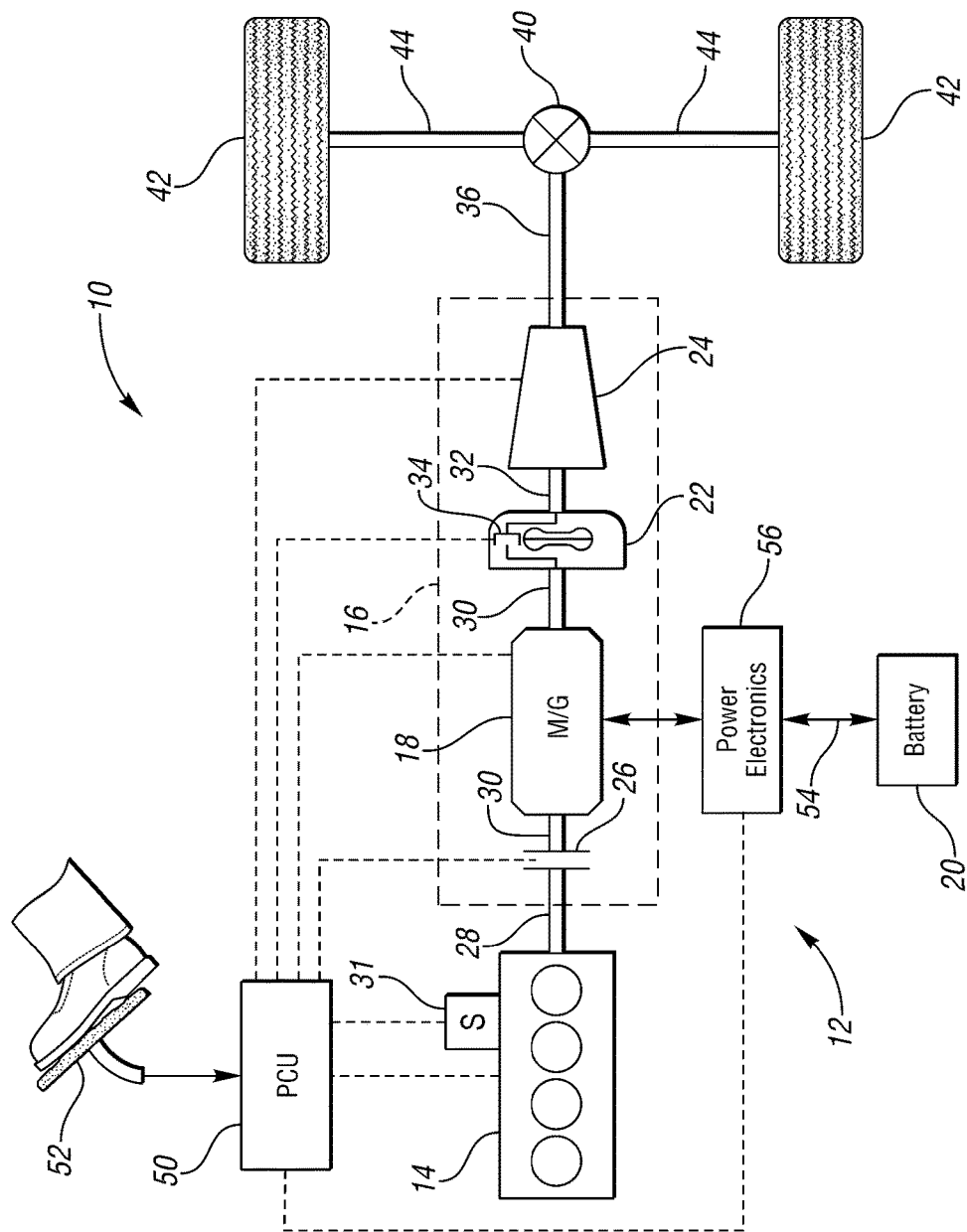
FIG. 1 is an illustrative embodiment of a schematic diagram of a hybrid electric vehicle (HEV).

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The engine 14, M/G 18, torque converter 22, and the automatic transmission 16 are connected sequentially in series, as illustrated in FIG. 1.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 2:
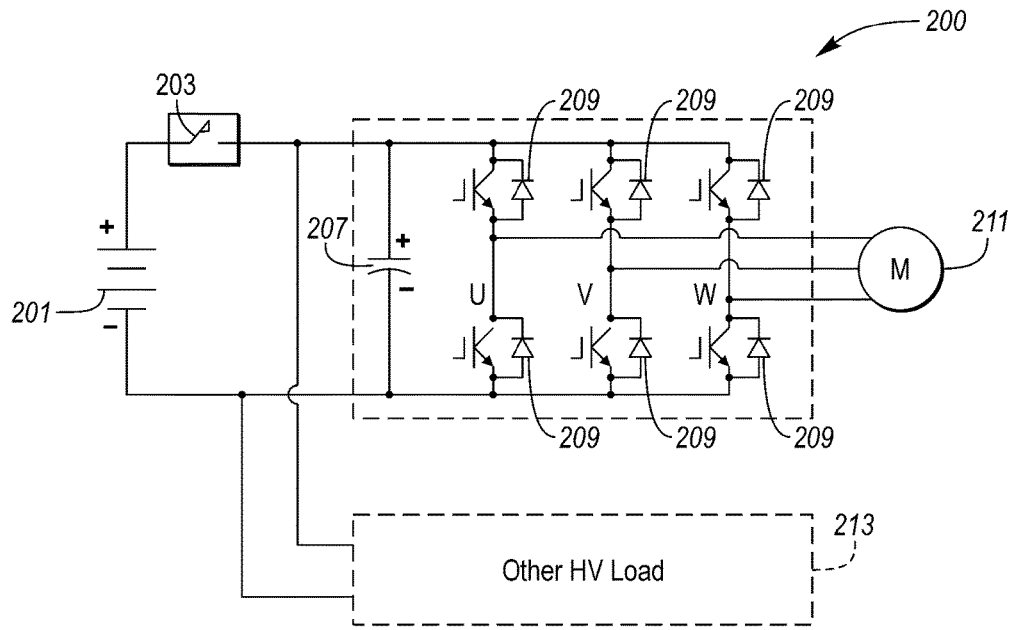
FIG. 2 is a system diagram illustrating an embodiment of an inverter system controller (ISC) of a hybrid electrical vehicle.

FIG. 2 illustrates an embodiment of a system diagram 200 of a MHT inverter system controller (ISC) of a hybrid electrical vehicle. During typical operation, the high voltage (HV) battery 201 may have its battery contactor 203 closed. The battery 201 may supply power to the inverter system controller (ISC), which may include, for example, six insulated gate bipolar transistors (IGBTs) 209 of the ISC. A capacitor 207 may be utilized to store an electric charge from the HV battery 201 to supply power to the ISC.

When the battery contactor 203 is closed, the HV DC voltage may be equal to the voltage of the battery 201. The motor 211 may be controlled by a Motor Control Unit (MCU) to output desired torque according to the vehicle level requirement. In such a system, no DC-link voltage control loop may be needed because the motor driver inverter and other HV loads 213 are directly connected to the HV battery 201 through the battery contactor 203. The other HV Loads may include a compressor or DC-DC converter.

If the battery contactor 203 is unintentionally opened (e.g. due to battery cell fault, contactor failure, or loose contact of high voltage DC connector, etc.), the HV DC circuit is separated from the HV battery 201. In such a scenario, the HV DC circuit may be charged or discharged based on the operating mode of the motor 211. If the motor is running in the regeneration mode, the power flows from the motor side to the DC side, and the DC-Link voltage may increase very quickly. This may trip the ISC over-voltage protection when the voltage increase from a normal value (e.g. less than or equal to 411 V) to a protection threshold (e.g. 480 V), and all the IGBT gating of the ISC will be forced "OFF." After that, the HV DC voltage may be determined by the back EMF of the motor, which may be proportional to motor speed. The inverter bridge may act as a 3-phase diode rectifier when seen from the motor-side to the HV DC circuit. If the motor is running in the high speed, the HV DC voltage could be charged as high as 680 V, which could potentially increase the voltage stress or even damage the ISC or any other HV load that is connected to the HV DC bus.

When the motor is running at high speed in the regeneration mode and the battery contactor is turned opened unintentionally, the HV DC may be charged from a normal DC voltage (less than or equal to 411 V) to the over-voltage protection threshold (e.g. 480 V). Additionally, the battery contactor becoming unintentionally opened may cause the over-voltage fault to trigger and turn off each of the IGBTs 209. In another scenario, the battery contactor becoming unintentionally closed may turn the inverter bridged to a 3-phase diode rectifier, and the HV DC bus may be further charged to a high-level (e.g. 680 V) by the back EMF of the high-speed spinning motor. Additionally, the ISC or any other HV load that connected to HV DC bus would suffer from high voltage stress or could even be damaged during an unintentional opening of the battery contactor.

Figure 3:
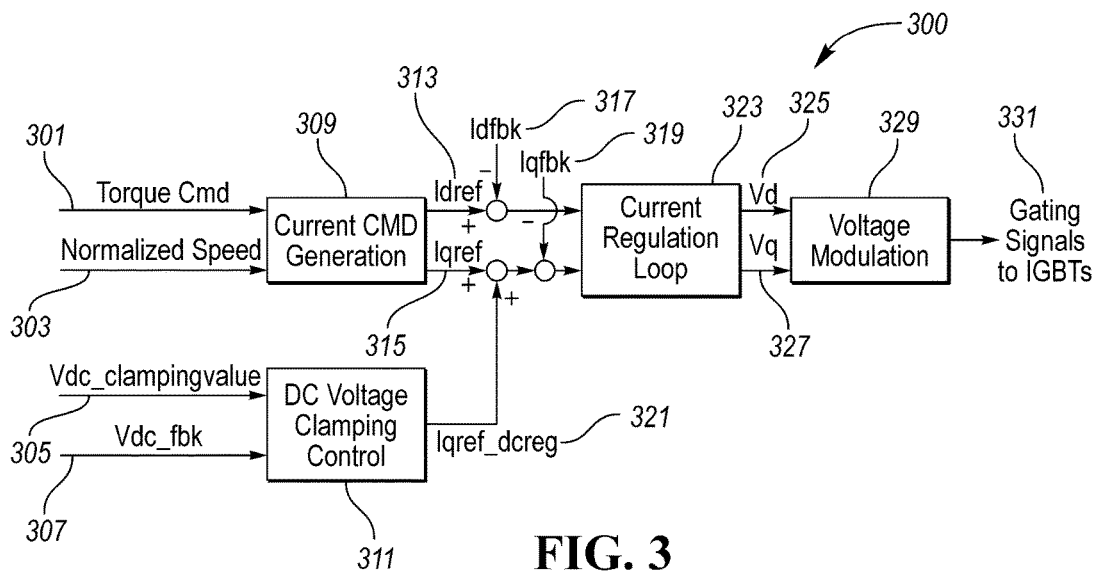
FIG. 3 illustrates an embodiment of a motor control method with DC voltage clamping control.

FIG. 3 illustrates an embodiment of a motor control method with a DC voltage clamping control. The torque command (Cmd) 301 is input from a vehicle system controller interacting with vehicle components, including a motor of a hybrid vehicle or an electric vehicle. Additionally the normalized speed 303 from a resolver is output to the current command generator (CCG) 309. The CCG 309 may receive the torque command 301 and may output a reference quadrature current value 315 and a reference direct current value 313. At the DC voltage clamping control block (CCB), the voltage from the DC clamping, $V_{dc\_clamping\_value}$ 305, and feedback voltage, $V_{dc\_fbk}$ 307, is output to the DC voltage clamping controller 311. The feedback voltage 307 may be received from a high voltage DC capacitor 207.

The clamping control block (CCB) inputs a HV DC voltage feedback, $V_{dc\_fbk}$ 307, and a pre-set DC clamping voltage reference, $V_{dc\_clampingvalue}$ 305 (e.g. 480 V). In turn, the CCB may output a reference current, such as a DC reference quadrature current $I_{qref\_dcreg}$ 321. The CCB output may be used to modify the q-axis reference current from the original quadrature current, $I_{qref}$ 315, by adding $I_{qref}$ 315 to the reference current, e.g. $I_{qref\_dcreg}$ 321. As shown in more detail in FIGS. 4(a) and (b), two embodiments illustrate various implementation methods of the CCB. Each of the methods in FIGS. 4(a) and 4(b) may be implemented by a DC voltage regulator (G(s)), which may be a simple proportion regulator ($K_p$) or a calibrated look-up table utilizing a microprocessor or other type of processor (e.g. digital signal processor, etc.) that includes a calibrated look-up table.

At a high level, the CCB will compare the high voltage (HV) DC voltage feedback, $V_{dc\_fbk}$ 307, with a pre-set DC clamping voltage reference, $V_{dc\_clampingvalue}$ 305 (e.g. 480 V). $V_{dc\_clampingvalue}$ 305 may be a reference value determined by a system controller and $V_{dc\_fbk}$ 307 may be the feedback from the HV DC capacitor 207. If the HV DC voltage is lower than DC clamping voltage reference 305, the CCB output $I_{qref\_dcreg}$ 321 may be zero and may indicate that there will be no impact on the motor control algorithm. However, if the DC feedback is higher than the voltage clamping reference, the CCB will be active, which will reverse the power flow, changing the motor from regeneration mode to motoring mode in order to reduce/discharge the HV DC voltage. This may be accomplished by adding the regulation output $I_{qref\_dcreg}$ 321 to original $I_{qref}$ 315. The CCB output may also be added to the torque command instead of $I_{qref}$ 315. When the HV DC voltage is higher than clamping voltage reference, the CCB will control/clamp the DC voltage by regulating power flow through modification of torque command or torque current $I_{qref}$ 315.

The current regulation loop 323 may receive the difference between the feedback current ($I_{qfbk}$) 319 and reference current (e.g. adding $I_{qref}$ 315 to the reference current, e.g. $I_{qref\_dcreg}$ 321). The current regulation loop 323 may be configured to rectify the current values input from the CCB and the CCG 319, and thus output a higher or lower voltage value for both the DC voltage ($V_d$) 325 and the quadrature voltage ($V_q$) 327. The DC voltage 325 and quadrature voltage 327 may be input to a voltage modulator 329. The voltage modulator 329 may utilize the values from the DC voltage 325 and the quadrature voltage 327 to output gating signals to the insulated gate bipolar transistors (IGBTs) 209 in communication with the motor 211. Voltage modulator 329 may output gating signals to turn on/off of the IGBTs 209 according to an input voltage command Vd 325 and Vq 327, which may be achieved by different modulation methods (e.g. pulse width modulation (PWM), six step (SS)).

Figure 4A:
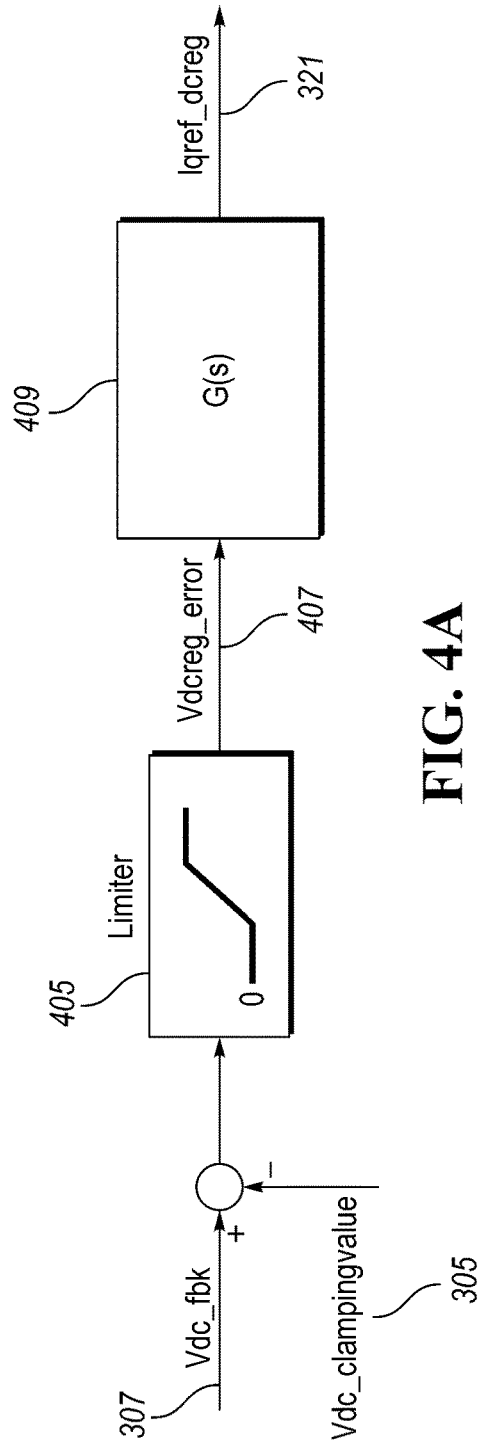
FIG. 4A illustrates an embodiment of a voltage clamp utilizing a voltage regulator.

FIG. 4A illustrates an embodiment of a voltage clamping control block utilizing a voltage regulator. The HV DC voltage feedback, $V_{dc\_fbk}$ 307 will be input based on the voltage feedback of the DC capacitor 207. The pre-set DC clamping voltage reference, $V_{dc\_clampingvalue}$ 305, will be input based on a pre-set value. The $V_{dc\_clampingvalue}$ 305 may be a defined value to reduce the voltage feedback of the DC capacitor 207. Such an amount may be, for example, 480 V. Both the voltage feedback ($V_{dc\_fbk}$) 307 and the pre-set DC clamping voltage reference ($V_{dc\_clampingvalue}$ 305) may be input to a voltage limiter 405. The voltage limiter may be utilized to limit the voltage feedback 307 and reference voltage value 305 that that is input from the clamping control block.

The voltage limiter 405 may output a limited voltage ($V_{dcreg\_error}$ 407) that will be input to a voltage regulator 409. The limited voltage may be utilized to limit a difference between the feedback voltage 307 and the reference voltage 305. The voltage limiter 405 may be utilized to confirm that the difference falls within or below a predetermined range when the difference exceeds a threshold value. The voltage regulator may be utilized to calculate an error value as the difference between a desired set point and measured process variable. The voltage regulator 409 may be utilized to minimize the error (including over time) by adjusting a control variable. The voltage regulator may be a proportion-integral-derivate controller or other control loop feedback mechanism. The voltage regulator 409 may then output the regulated current $I_{qref\_dcreg}$ 321. As shown in FIG. 3, the regulated current is further utilized in a current regulation loop in conjunction with other current values.

Figure 4B:
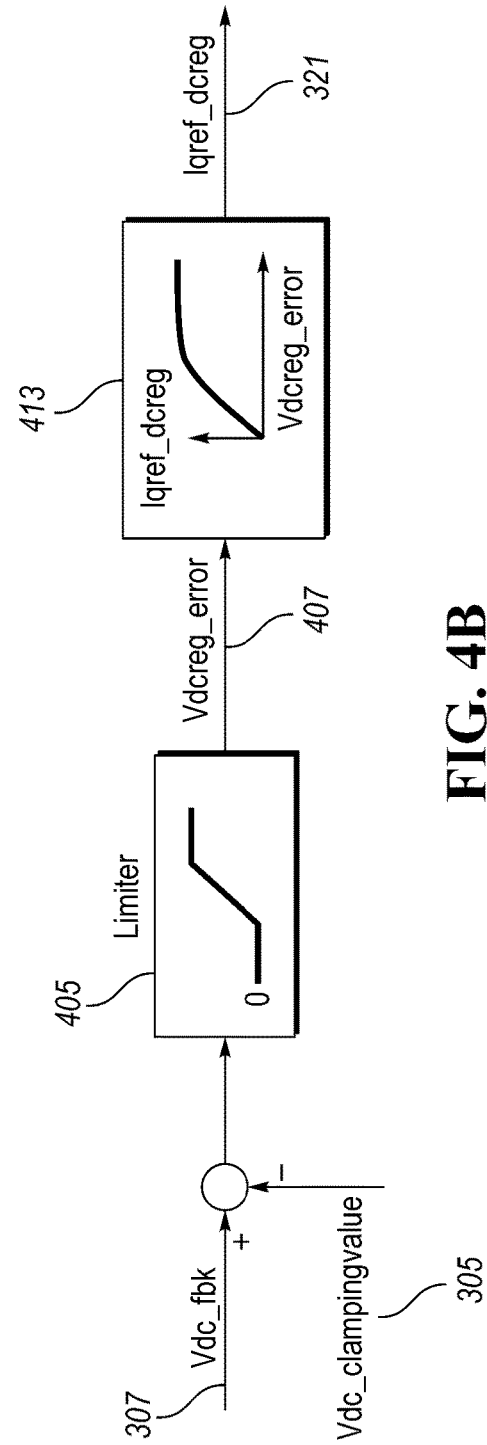
FIG. 4B illustrates an embodiment of a voltage clamp utilizing a look-up table.

FIG. 4B illustrates an embodiment of a voltage clamping control block utilizing a voltage look-up table. The HV DC voltage feedback, $V_{dc\_fbk}$ 307 will be input based on the voltage feedback of the DC capacitor 207. Both the voltage feedback ($V_{dc\_fbk}$) 307 and the pre-set DC clamping voltage reference ($V_{dc\_clampingvalue}$ 305) may be input to a voltage limiter 405. The voltage limiter 405 may be utilized to confirm that the difference falls within a predetermined range when the difference exceeds a threshold value.

The voltage limiter 405 may output a limited voltage ($V_{dcreg\_error}$ 407) that will be utilized with a look-up table 413 stored on one or more controllers. The look-up table 413 may be utilized to determine a corresponding regulated reference current $I_{qref\_dcreg}$ 321 in view of the limited voltage. The look-up table 413 may map reference current values to limited error voltage values. The clamping control block will then output the regulated current, as shown in FIG. 3, utilizing the mapped current value from the look-up table 413.

Figure 5A:
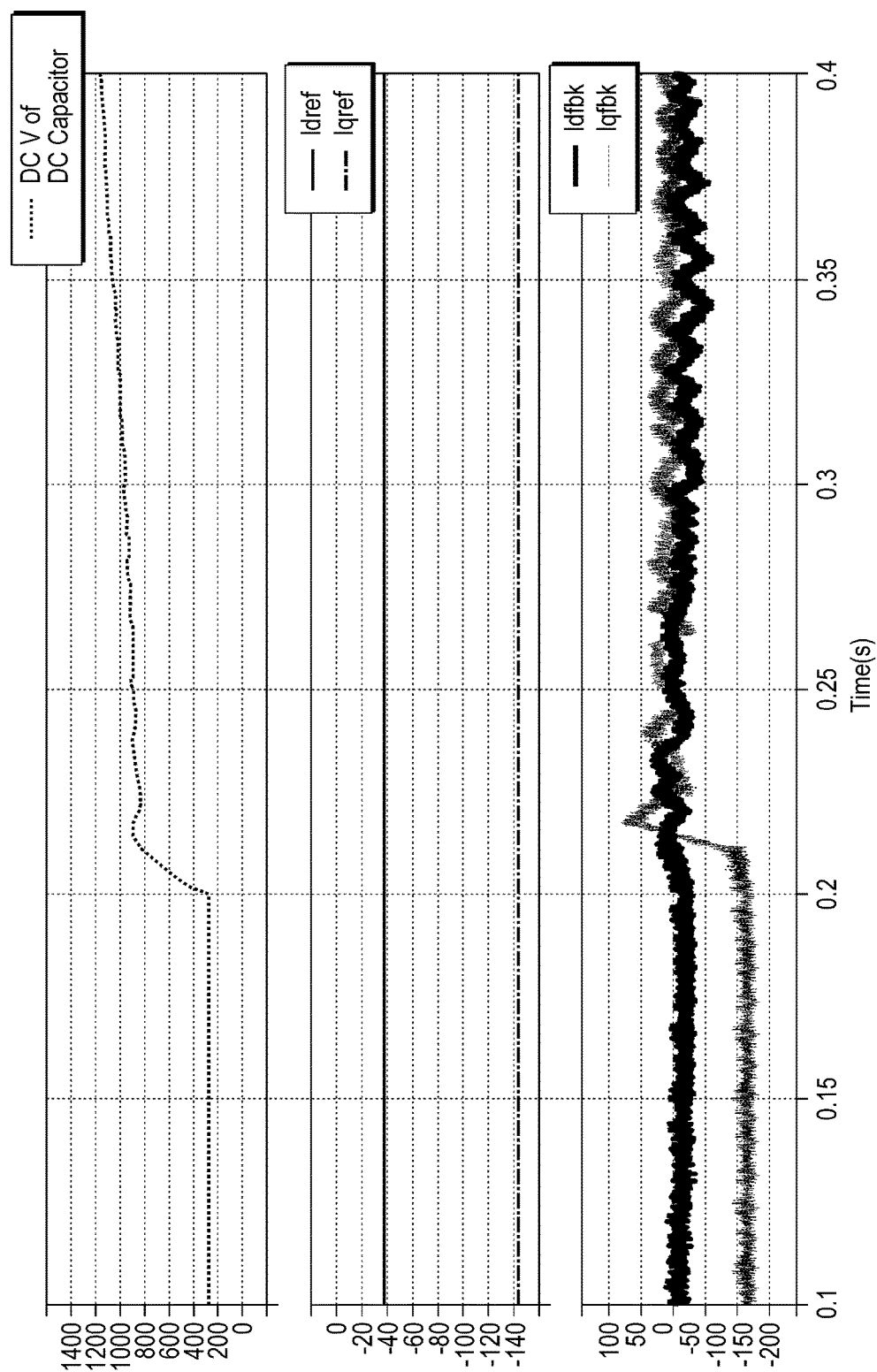
FIG. 5A illustrates an example of simulation results without utilizing the clamping control block.

FIG. 5A discloses an example of simulation results without utilizing the clamping control block. As shown, the HV DC can be charged to an over-voltage protection threshold value (e.g. over 680 V) without utilizing a CCB when the battery circuit is turned OPEN at 0.2 S.

Figure 5B:
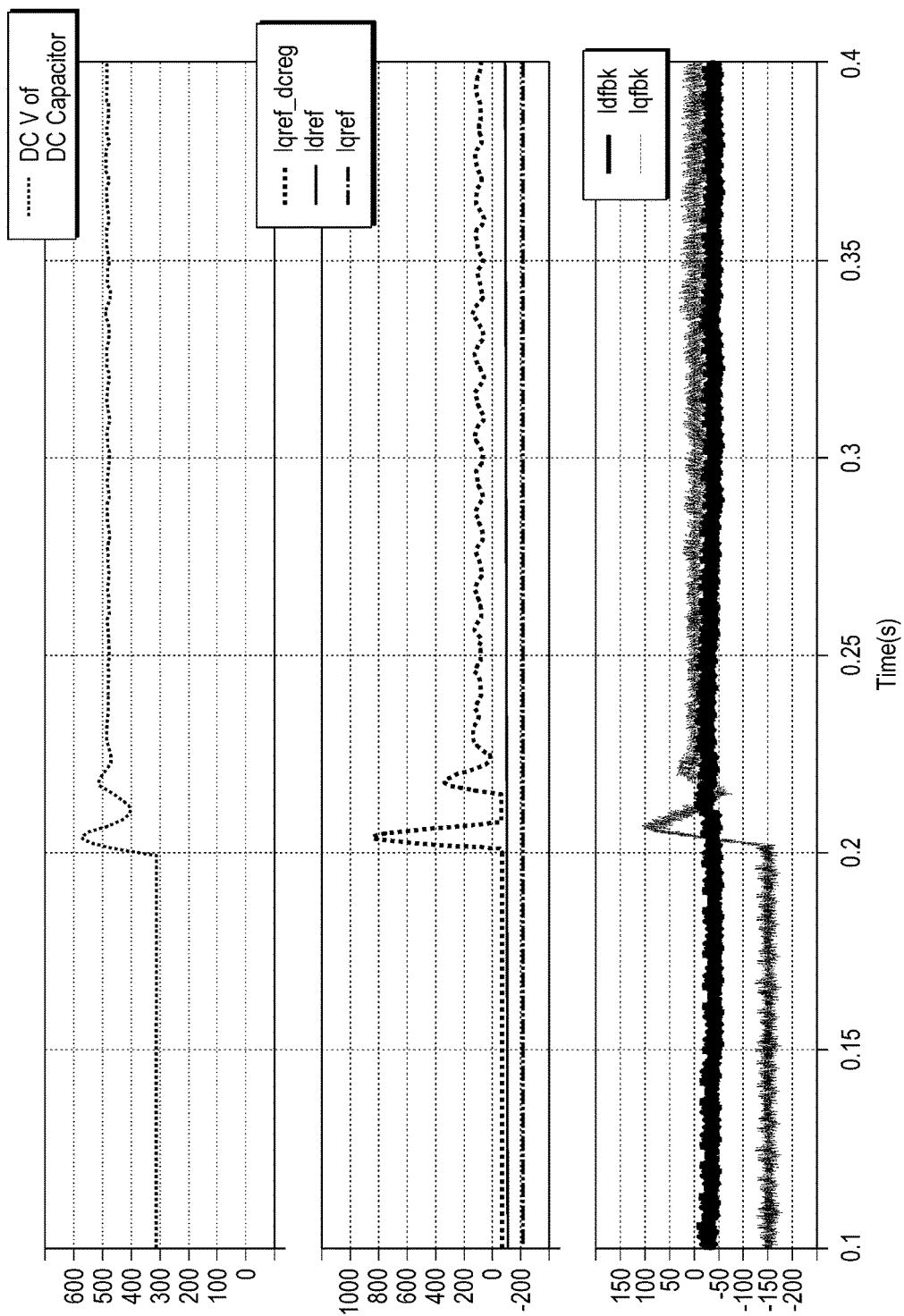
FIG. 5B illustrates an example of simulation results utilizing the clamping control block.

FIG. 5B discloses an example of simulation results utilizing the clamping control block disclosed above. When the battery circuit is turned OPEN at 0.2 s, the clamping control block is active and clamps the HV DC voltage to a pre-set DC clamping voltage reference (pre-set at 450V shown in FIG. 5B). The max voltage, which may factor over-shoot of the voltage, may be set at 550V (or another voltage), but no over-voltage fault will be triggered.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle system in a hybrid vehicle, comprising:
a controller configured to receive a reference voltage defining a threshold voltage value and a feedback voltage defining a direct current (DC) voltage of a DC capacitor of a vehicle motor inverter, and to generate for output a reference current via at least a voltage limiter in response to a difference between the feedback and reference voltages exceeding a threshold to prevent voltage spikes on the DC capacitor.

2. The vehicle system of claim 1, wherein the controller is further configured to generate for output the reference current via a regulator and the voltage limiter.

3. The vehicle system of claim 2, wherein the voltage limiter outputs a limited error voltage according to the difference and wherein the limited error voltage defines a regulated voltage.

4. The vehicle system of claim 3, wherein the difference and the limited error voltage are same.

5. The vehicle system of claim 2, wherein the voltage regulator is a proportion-integral-derivate controller.

6. The vehicle system of claim 1, wherein the controller is further configured to generate for output the reference current via a look-up table and the voltage limiter.

7. The vehicle system of claim 6, wherein the look-up table maps reference current values to limited error voltage values.

8. The vehicle system of claim 1, wherein the controller is further configured to output the reference current to a current regulation loop.

9. A vehicle system in a hybrid vehicle, comprising:
a controller configured to generate for output a modulated voltage to a direct current (DC) capacitor to prevent voltage spikes of the capacitor in response to receiving a reference current via a DC voltage clamping control block configured to output a reference current in response to a difference between a feedback voltage and a reference voltage exceeding a threshold.

10. The vehicle system of claim 9, wherein the controller is further configured to generate for output the modulated voltage via a current regulation loop configured to rectify the difference.

11. The vehicle system of claim 10, wherein the current regulation loop is configured to output a direct voltage and quadrature voltage.

12. The vehicle system of claim 9, wherein the controller is further configured to generate for output the modulated voltage via a voltage modulator.

13. The vehicle system of claim 9, wherein the DC voltage clamping control block utilizes a voltage limiter to output the reference current in response to a difference between the feedback and reference voltages exceeding a threshold to prevent voltage spikes on the DC capacitor.

14. The vehicle system of claim 9, wherein the DC voltage clamping control block is further configured to generate for output the reference current via a look-up table and a voltage limiter.

15. The vehicle system of claim 14, wherein the look-up table maps reference current values to limited error voltage values.

16. The vehicle system of claim 9, wherein the controller is further configured to generate for output the modulated voltage via a voltage modulation block configured to modulate a DC voltage and a quadrature voltage.

17. A method in a hybrid vehicle, comprising:
receiving a reference voltage defining a threshold voltage value, and a feedback voltage defining a direct current (DC) voltage of a DC capacitor of a vehicle motor inverter; and
generating for output a reference current via at least a voltage limiter in response to a difference between the feedback and reference voltages exceeding a threshold to prevent voltage spikes on the DC capacitor.

18. The method of claim 17, wherein the generating for output the reference current is via a regulator and the voltage limiter.

19. The method of claim 17, wherein the method further includes the step of outputting via voltage limiter a limited error voltage according to the difference and wherein the limited error voltage defines a regulated voltage.

20. The method of claim 19, wherein the difference and the limited error voltage are same.

* * * * *